May 17, 1960
S. GUSTAFSSON
2,936,850
COLLECTING ELECTRODE OF THE HOLLOW
BOX TYPE FOR ELECTROFILTERS
Filed Dec. 6, 1956
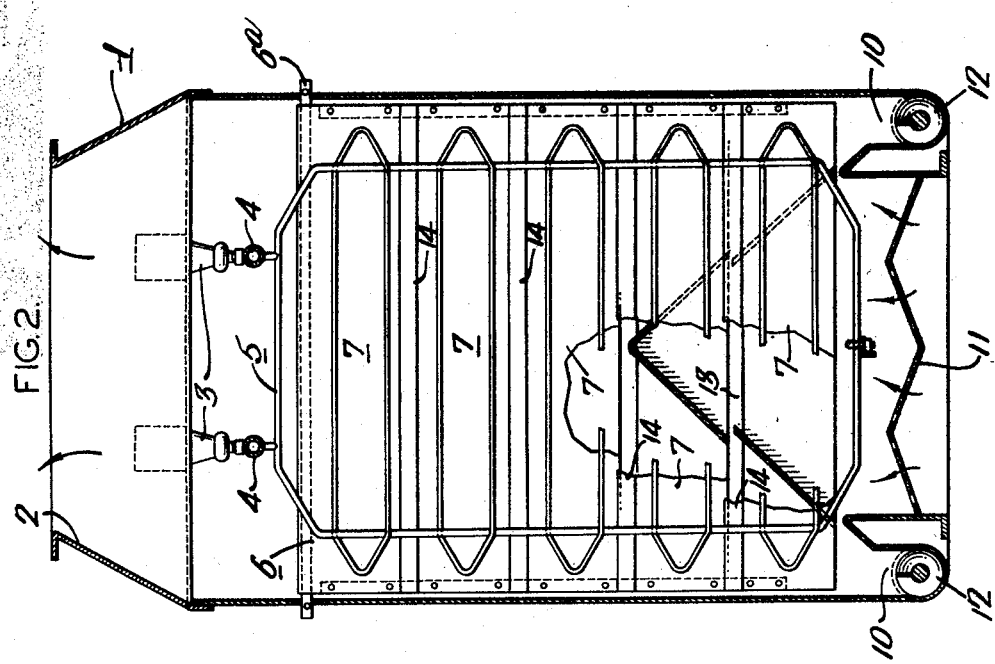
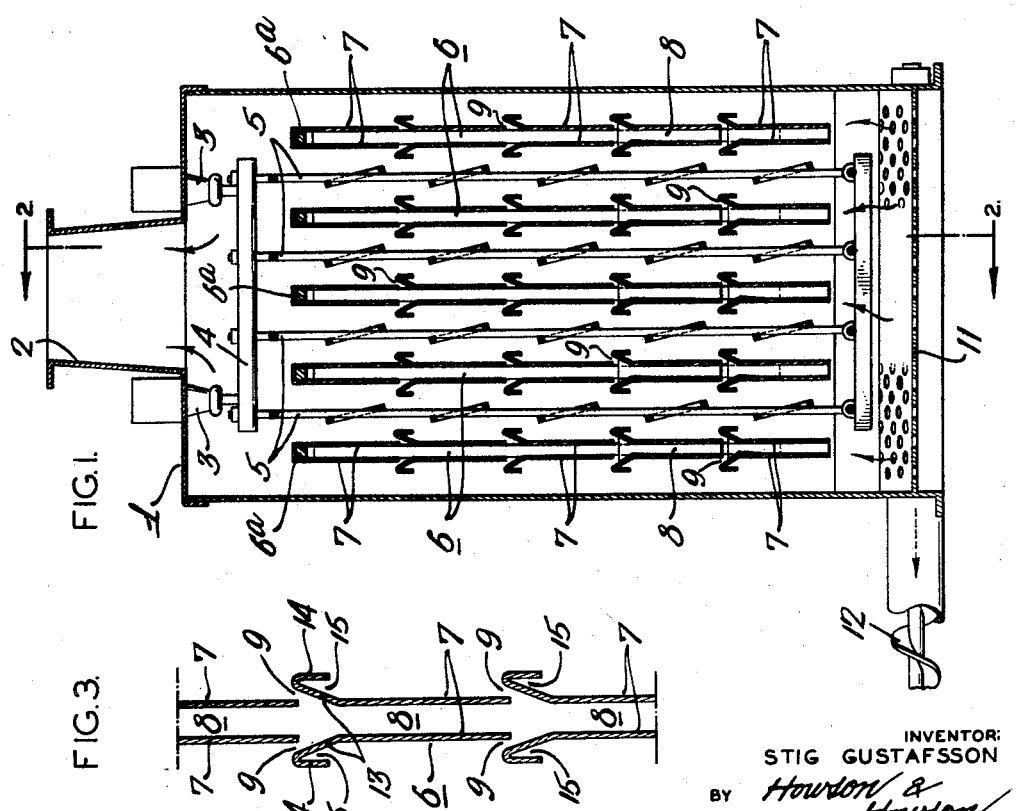
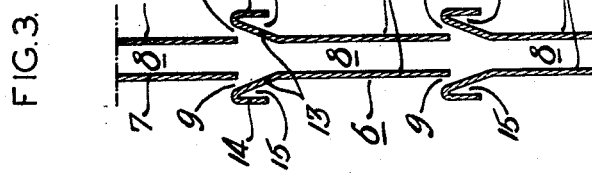
INVENTOR:
STIG GUSTAFSSON
BY Howson & Howson
ATTYS.

United States Patent Office 2,936,850
Patented May 17, 1960

2,936,850

COLLECTING ELECTRODE OF THE HOLLOW BOX TYPE FOR ELECTROFILTERS

Stig Gustafsson, Jonkoping, Sweden, assignor to AB Svenska Flaktfabriken, Kungsgatan, Stockholm, Sweden Application December 6, 1956, Serial No. 626,717

Claims priority, application Sweden December 9, 1955

1 Claim. (Cl. 183—7)

The present invention relates to an improved performance of a collecting electrode for electrofilters of the so called hollow box electrode type, having double vertical walls, each consisting of a number of plates extending lengthwise and arranged above each other, said plates being fastened to a common suspending device and forming slits for conducting away precipitated, down-falling dust to a space, constituting a hollow box between the walls.

It is well known in the art to use collecting electrodes of this type to prevent precipitated dust to be caught and again be disperged in the gas current during the vibration of the electrodes for cleaning purposes. By leading the down-falling dust successively through the slits into the "hollow box space" said dust can fall down into the dust accumulating pocket without any disturbances from the gas current. It has however proved that also by using collecting electrodes of this performance, a part of the dust specially the finer grades of the dust will get caught by the gas current before said dust reaches the "hollow box space." Furthermore by using such collecting electrodes as well as such of other performances there is always a certain risk that finer dust particles substantially moving in the middle of the gas current owing to their small electrical charge are not able to traverse the distance to the electrode and be precipitated on said electrode. If the gas velocity in the electrofilter is relatively high, also greater dust particles—depending upon the driving force—can continue straight forwards without being deposited.

It is an object of the present invention to substantially eliminate said disadvantages and the invention is characterized in that all the plates of each of the walls are preformed with an upper edge being folded outwards and forming an oblique angle with the wall plane, said edge furthermore having a double bent edge line, by means of which dust-catching grooves facing the flow of the gas current are constituted besides that a suitable performance of said slots for the discharge of down-falling dust is gained.

The invention will now be described more in detail with reference to the accompanying drawing illustrating an electrofilter with collecting electrodes in accordance with the invention.

In the drawing Fig. 1 shows a vertical cross section through an electrofilter,

Fig. 2 shows a longitudinal section of the same filter, and

Fig. 3 illustrates in a greater scale the performance of the electrode plates.

In the drawing 1 designates the casing to an electrofilter provided with an intake 11 for raw gas and an outlet 2 for clean gas. 5 designates a number of discharge electrodes arranged in parallel rows, which electrodes in a manner known per se are suspended in a frame 4 being fastened on insulators 3. On both sides of the discharge electrodes there are collecting electrodes 6, which in the case shown are preformed as so called "hollow box electrodes," having double vertical walls formed of a number of plates 7 extending lengthwise and arranged above each other, said plates being fastened on a common suspending device 6a. Slits 9 extending lengthwise are formed between said plates and down-falling, precipitated dust can be conducted through said slits into the "hollow box space" 8 between the plate walls. Dust being conducted into said space can fall down in the dust pocket 10 of the electrofilter, from which pocket the dust in the case shown is transported away by means of the screw conveyor 12. The electrode plates 7—as is most obvious from Fig. 3—are in accordance with the invention at their upper edge pre-formed with a part 13 bent outwards with respect to the wall plane and form an oblique angle with respect to said wall and have a part 14 being double bent and directed backwards, forming a dust-catching groove 15 facing the flow of the gas current, the uppermost part of each outwardly bent portion being located above the lower terminal edge of the upwardly adjacent plate, so as to form the slot 9 between a vertical portion of an upper plate and an inwardly sloped portion 13 of a lower plate.

What I claim is:

In electrofilters of the hollow-box electrode type having vertical flow of the gas to be purified, collecting electrodes having double vertical walls, each wall consisting of a number of coplanar laterally elongated imperforate plates arranged one above the other in vertically spaced relation to form therebetween horizontally extending slots for conducting away precipitated downfalling dust into the space intermediate said double vertical walls, and a common suspending device fastened to said plates at their lateral ends, whereby said slots are substantially uninterrupted between said suspending device, and the upper portion of each of said plates having an outward bend to form an oblique angle with the common wall plane in order to guide the down-falling dust through said slots into said intermediate space, the improvement wherein each of said plates at its outmost part of said outwardly bent portion has a reversely directed leg substantially parallel to said common wall plane, said leg being integrally united to said plate by a reverse bend in said plate, thereby forming a dust-catching groove facing the flow of the gas current, the outward and reverse bends forming a smooth uninterrupted surface devoid of crevices and joints on each of the upper and under surfaces of said upper portion, the outermost part of the outwardly bent upper portion being disposed above the lower terminal edge of the upwardly adjacent plate to slightly overlap the same and enclose the horizontally extending slot therebetween, the reversely-bent leg being substantially vertically coextensive with said outwardly bent upper portion to expose the remainder of said plate directly to the flow of gas in the electrofilter.

References Cited in the file of this patent

FOREIGN PATENTS

| | | |
|---|---|---|
| 873,832 | Germany | Apr. 16, 1953 |
| 1,109,349 | France | Sept. 21, 1955 |
| 1,110,172 | France | Oct. 5, 1955 |